(12) United States Patent
Sun

(10) Patent No.: US 8,300,400 B2
(45) Date of Patent: Oct. 30, 2012

(54) FIXING MECHANISM AND HARD DISK ASSEMBLY USING THE SAME

(75) Inventor: Zheng-Heng Sun, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 221 days.

(21) Appl. No.: 12/872,212

(22) Filed: Aug. 31, 2010

(65) Prior Publication Data

US 2011/0235266 A1 Sep. 29, 2011

(30) Foreign Application Priority Data

Mar. 26, 2010 (CN) .......................... 2010 1 0133503

(51) Int. Cl.
*H05K 5/00* (2006.01)
*G11B 33/02* (2006.01)
*F16B 37/00* (2006.01)

(52) U.S. Cl. ............. 361/679.37; 248/224.8; 369/75.11; 411/104

(58) Field of Classification Search ............. 361/679.33–679.39, 724–727; 248/224.8, 201; 312/332.1, 333; 369/75.11; 411/999, 104

See application file for complete search history.

(56) References Cited

U.S. PATENT DOCUMENTS

| | | | | |
|---|---|---|---|---|
| 5,004,207 A * | 4/1991 | Ishikawa et al. | ............... | 248/632 |
| 5,566,049 A * | 10/1996 | Nguyen | .................... | 361/679.32 |
| 6,190,102 B1* | 2/2001 | Vignotto et al. | ............... | 411/399 |
| 6,862,173 B1* | 3/2005 | Konshak et al. | ......... | 361/679.33 |
| 7,423,883 B2* | 9/2008 | Carlson et al. | ................ | 361/724 |
| 7,495,906 B2* | 2/2009 | Fujie et al. | ............... | 361/679.49 |
| 7,508,675 B2* | 3/2009 | Just | ............................... | 361/725 |
| 7,926,780 B2* | 4/2011 | Yeh et al. | ....................... | 248/632 |
| 2008/0037209 A1* | 2/2008 | Niazi et al. | ..................... | 361/683 |
| 2012/0075791 A1* | 3/2012 | Sun | ........................... | 361/679.33 |

* cited by examiner

*Primary Examiner* — Zachary M Pape

(74) *Attorney, Agent, or Firm* — Altis Law Group, Inc.

(57) ABSTRACT

A fixing mechanism for fixing a number of hard disks includes a first frame; a second frame facing the first frame, and a fixing structure for fixing the hard disk. One side of each hard disk is fixed on the first frame, and the fixing structure is positioned and fixed on the second frame and also fixed on the other side of the hard disk.

14 Claims, 5 Drawing Sheets

FIXING MECHANISM AND HARD DISK ASSEMBLY USING THE SAME

BACKGROUND

1. Technical Field

The present disclosure relates to a fixing mechanism, and particularly to a fixing mechanism for fixing a storage device and a hard disk assembly using the same.

2. Description of the Related Art

Hard disks are generally mounted in a computer case with a fixing mechanism. The fixing mechanism includes a bottom plate for supporting the hard disks. However, upon the mounting of the storage device such as the hard disks, the bottom plate, being completely sealed off upon securing on a plate member, thereby prevents air from flowing past the hard disks, thus reducing the cooling efficiency within the computer case. However, even upon forming of a plurality of vent holes on the plate member, due to the substantial amount of contact area which exist between the hard disks and the plate member, cooling efficiency would remain inadequate.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views, and both the views are schematic.

DETAILED DESCRIPTION

Figure 1:
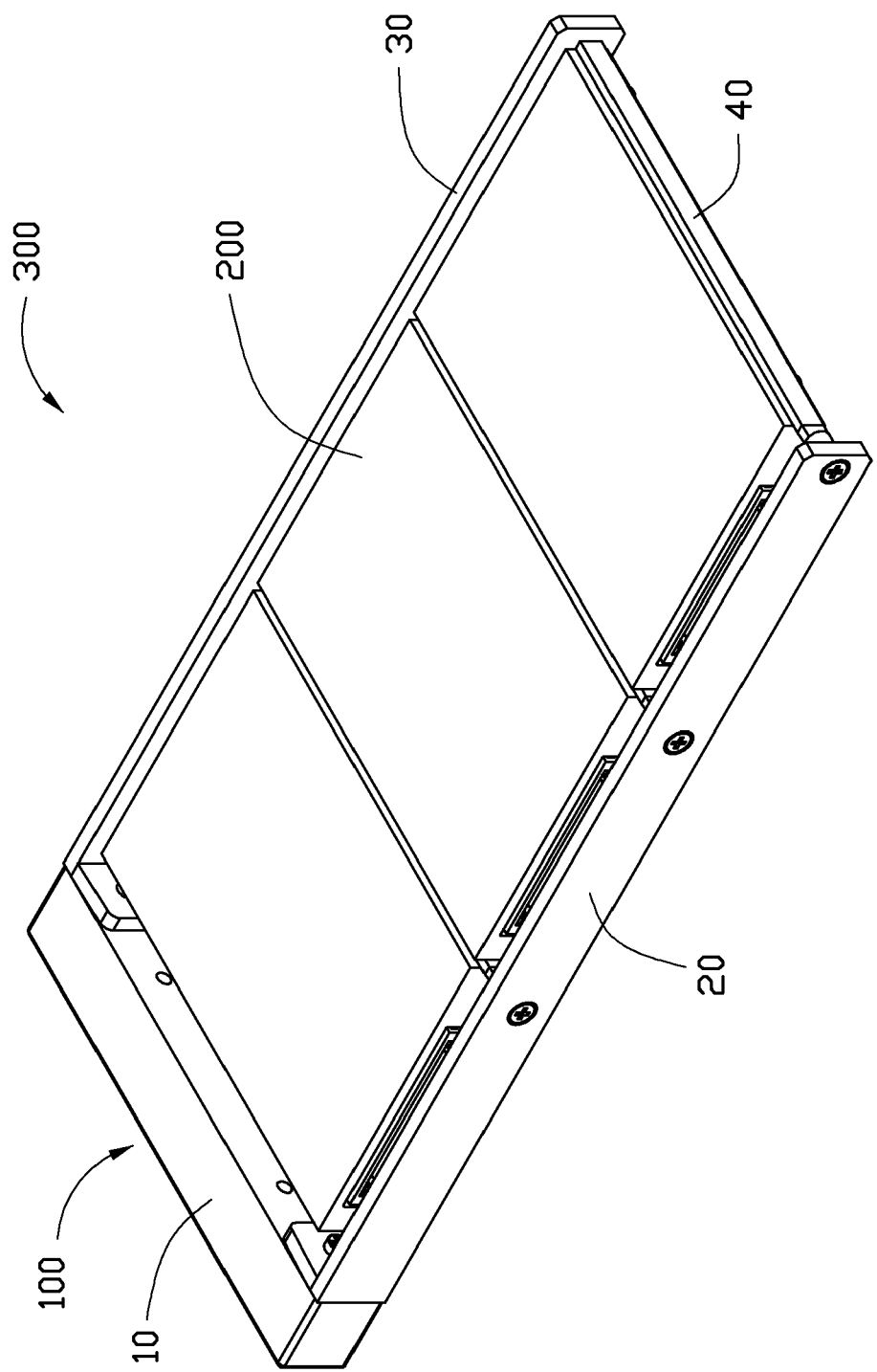
FIG. 1 is an isometric view of an embodiment of a hard disk assembly.
Figure 2:
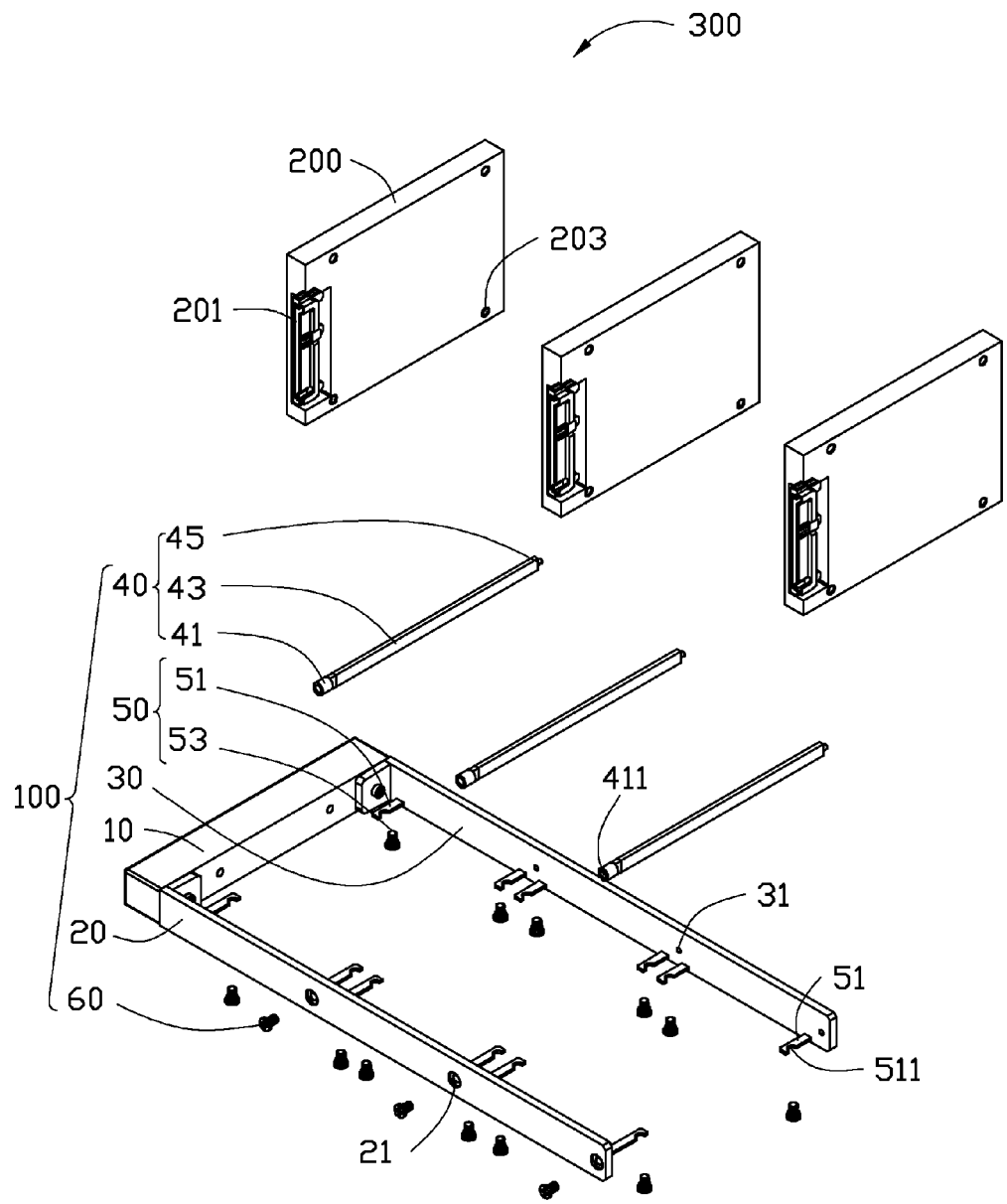
FIG. 2 is an exploded, isometric view of the hard disk assembly shown in FIG. 1, in which the hard disk assembly includes a fastening member.

Referring to FIGS. 1 and 2, an exemplary embodiment of a hard disk assembly 300 includes a fixing mechanism 100 and a number of hard disks 200 fixed in the fixing mechanism 100. The fixing mechanism 100 includes a connecting member 10, a first frame 20, a second frame 30, a number of dividers 40, a fixing structure 50, and a number of fasteners 60. The fixing structure 50 is disposed between the first frame 20 and the second frame 30. The connecting member 10 is substantially a bar, the first frame 20 is fixed at an end of the connecting member 10, and the second frame 30 is fixed at the other end of the connecting member 10. The first frame 20 and the second frame 30 are arranged in parallel. The dividers 40 interconnect the first frame 20 and the second frame 30. The dividers 40 are spaced apart from each other. The fasteners 60 are used for fixing the dividers 40 on the first frame 20. In the illustrated embodiment, there are three dividers 40 and three corresponding fasteners 60, and each fastener 60 is a screw.

The first frame 20 defines three connecting holes 21 therein. The distance between adjacent connecting holes are substantially equal. The second frame 30 defines three inserting holes 31 corresponding to the connecting holes 21, respectively. Each pair of corresponding connecting holes 21 and inserting holes 31 form a line from their respective centers to be substantially perpendicular to the first frame 20 and the second frame 30.

Figure 3:
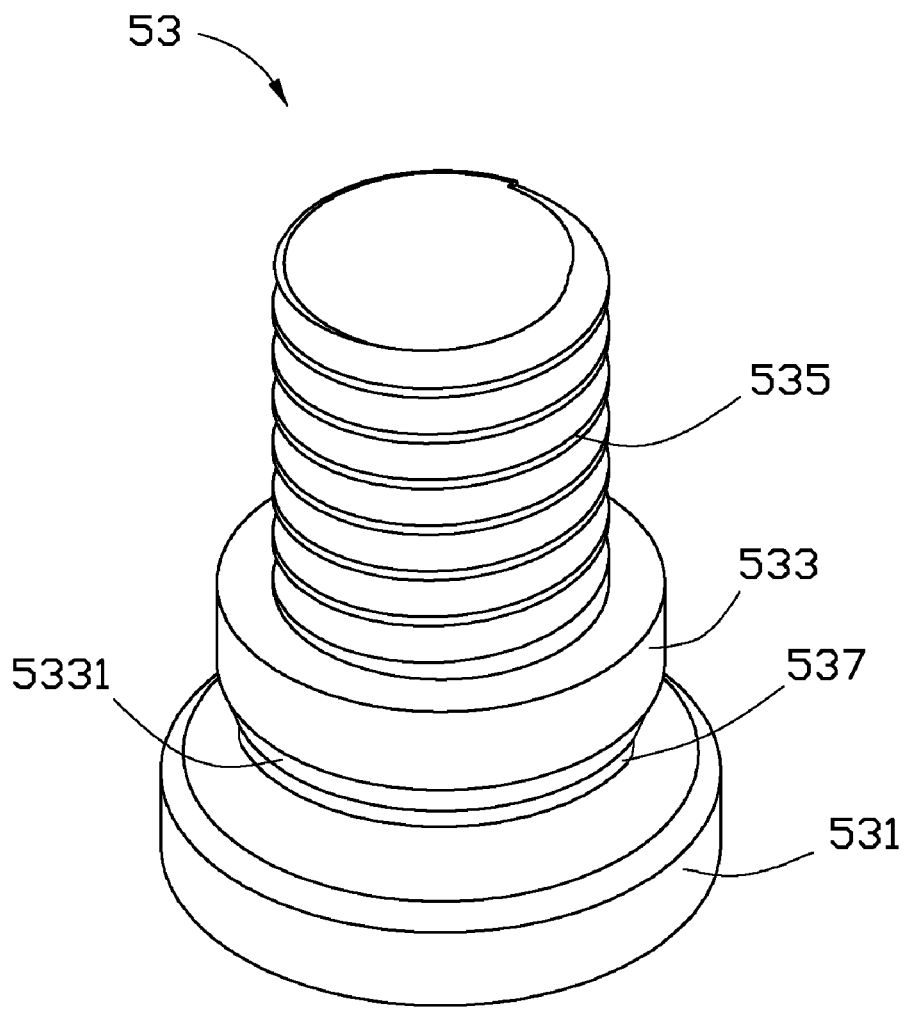
FIG. 3 is the fastening member shown in FIG. 2.

Each divider 40 has a shape of a stick, and includes a connecting portion 41, a clamping portion 43 for clamping as many as two adjacent hard disks 200, and an inserting portion 45 for connecting to the second frame 30. The divider 40 can also be in the shape of a bar. The connecting portion 41 is formed at an end of the clamping portion 43. The inserting portion 45 is formed at the other end of the clamping portion 43. The connecting portion 41 defines a shaft hole 411 along an axial direction thereof. Referring to FIG. 2, the fixing structure 50 includes a connecting arm 51 and a fastening member 53. An end of the connecting arm 51 is fixed on the first frame 20 or the second frame 30 and is substantially perpendicular to the first frame 20 or the second frame 30; and the other end of the connecting arm 51 extends between the first frame 20 and the second frame 30 as a free end. The connecting arm 51 defines a semicircular shaped cutout 511 in a lateral side thereof, and the cutout 511 is located adjacent to the free end. Referring to FIG. 3, the fastening member 53 is a screw and includes a cap 531, a flange 533 and a threaded portion 535. The fastening member 53 defines a latching slot 537 between the cap 531 and the flange 533. The flange 533 defines a chamfer 5331 for mounting convenience. Each disk 200 defines a receiving hole 201 at an end thereof. The length of the hard disk 200 is slightly less that the distance between the first frame 20 and the second frame 30.

Figure 4:
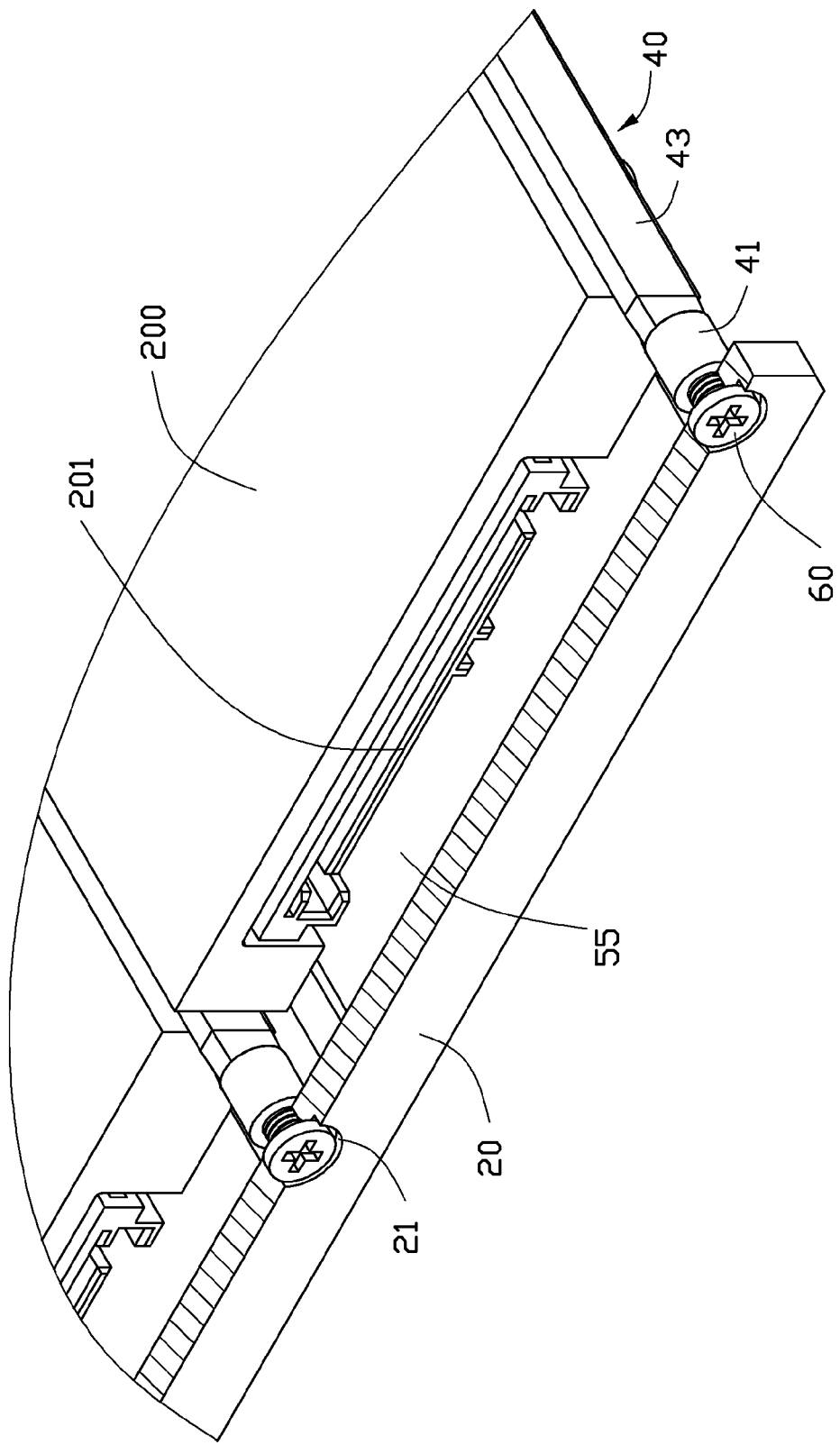
FIG. 4 is a partial cross sectional view of the hard disk assembly.
Figure 5:
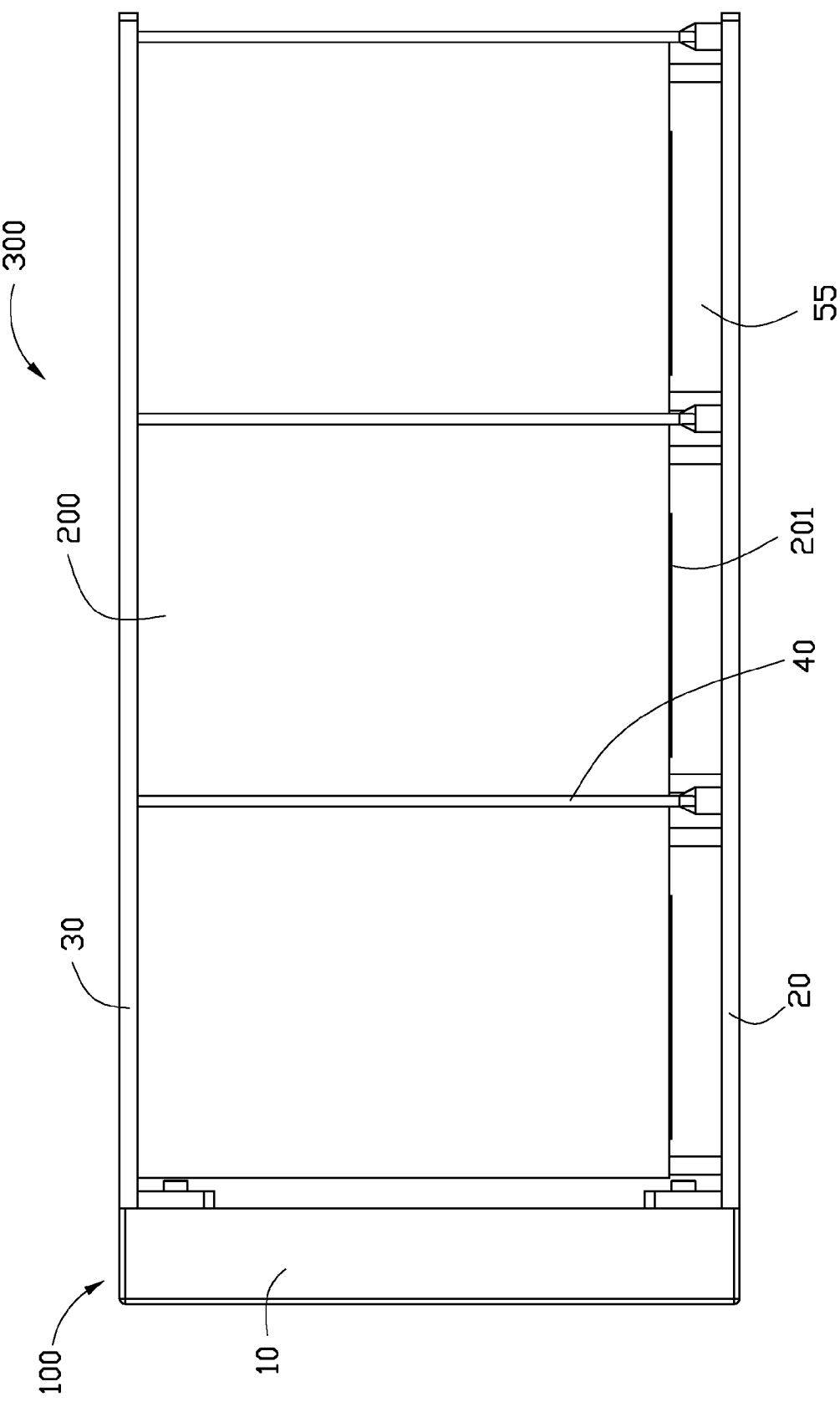
FIG. 5 is a bottom view of the hard disk assembly shown in FIG. 1.

Referring FIGS. 4 and 5, the hard disks 200 are positioned between the first frame 20 and the second frame 30 in order, and the end of the hard disk 200 that is away from the receiving hole 201 contacts the second frame 30. A gap 55 is defined between the hard disk 200 and the first frame 20 for cooling. A fixing hole 203 of the hard disk 200 communicates with the cutout 511 of the connecting arm 51, the threaded portion 535 of the fastening member 53 passes the cutout 511 and threadedly engages in the fixing hole 203, to fix the hard disk 200 on the fixing mechanism 100. The connecting arm 51 is latched in the latching slot 537 of the fastening member 53. The connecting arm 51 can also be in the shape of a long bar, in which one side is fixed on the first frame 20 or the second frame 30 and the other side is suspended between the first frame 20 and the second frame 30. The connecting arm 51 can have a through hole (not shown) for securing the fastening member 53 to the hard disk 200.

Referring to FIGS. 2 and 4, each of the inserting portions 45 of the divider 40 is inserted into the inserting hole 31 of the second frame 30. The shaft hole 411 of the connecting portion 41 is aligned to the respective connecting hole 21 of the first frame 20. The fastener 60 then passes through the connecting hole 21 of the first frame 20 and is screwed in the shaft hole 411 of the divider 40, in order to securely fix the divider 40 between the first frame 20 and the second frame 30. In general, two adjacent dividers 40 clamp one hard disk 200, and each divider 40 divides adjacent hard disks 200. Thus, almost all of the bottom surface of each hard disk 200 is exposed, the cooling ability of the fixing mechanism 100 is improved, and the lifespan of the hard disk 200 is prolonged.

Finally, while particular embodiments have been described, the description is illustrative and is not to be construed as limiting. For example, various modifications can be made to the embodiments by those of ordinary skill in the art without departing from the true spirit and scope of the invention as defined by the appended claims.

What is claimed is:

1. An apparatus for fixing hard disks, comprising: a first frame; a second frame facing the first frame; and a fixing structure comprising a plurality of fixing units, each of the fixing units comprising a connecting arm and a fastening member, the fastening member configured to be attached to a hard disk, the connecting arm comprising a fixed end and a free end, the fixed end being fixed to one of the first frame and the second frame, and the free end being opposite to the fixed end and pointing toward the other one of the first frame and the second frame; wherein the fastening member comprises a latching slot, the connecting arm has a cutout defined in a lateral side thereof, the cutout is located adjacent to the free end, and the connecting arm is latched into the latching slot of the fastening member at the cutout, a plurality of dividers each interconnecting the first frame and the second frame, wherein each two adjacent dividers are configured for clamping a corresponding one of the hard disks therebetween, and each of the dividers comprises a clamping portion for clamping at least one corresponding hard disk, a connecting portion formed at an end of the clamping portion and engaged to the first frame, and an inserting portion formed at the other end of the clamping portion and engaged to the second frame.

2. The apparatus of claim 1, wherein the fastening member comprises a cap, a threaded portion configured to be fixed to the hard disk, and a flange, the latching slot is between the cap and the flange, the flange is between the latching slot and the threaded portion, and the flange defines a chamfer adjacent to the latching slot, with the chamfer tapered toward the cap.

3. The apparatus of claim 2, wherein the connecting arm is an elongated plate, and the cutout has a semicircular shape.

4. The apparatus of claim 1, further comprising a plurality of fasteners, wherein the first frame has a plurality of connecting holes defined therein, the second frame has a plurality of inserting holes defined therein, the inserting portion of each divider is inserted in a corresponding inserting hole of the second frame, the connecting portion of each divider has a shaft hole defined along an axial direction thereof, the shaft hole of the divider is aligned with a corresponding connecting hole of the first frame, and one of the fasteners passes through the corresponding connecting hole of the first frame and is fixed into the shaft hole of the divider.

5. The apparatus of claim 4, further comprising a connecting member, wherein two ends of the connecting member are respectively connected to the first frame and the second frame, and the first frame, the connecting member and the second frame thereby cooperatively form a U-shaped structure.

6. A hard disk assembly comprising: a plurality of hard disks; and an apparatus for fixing the hard disks, the apparatus comprising: a first frame; a second frame facing the first frame; and a fixing structure located between the first frame and the second frame; the fixing structure comprising a plurality of first fixing units and a plurality of second fixing units, the first fixing units arranged along the first frame, the second fixing units arranged along the second frame and being positioned symmetrically opposite to the first fixing units; each of the first fixing units and the second fixing units comprising a connecting arm and a fastening member corresponding to the connecting arm, the connecting arm comprising a fixed end and a free end opposite to the fixed end; the fixed end of the connecting arm of each first fixing unit being fixed to the first frame, the fixed end of the connecting arm of each second fixing unit being fixed to the second frame, the fastening member corresponding to the connecting arm of each first fixing unit being attached to an end of a corresponding hard disk, the fastening member corresponding to the connecting arm of the corresponding second fixing unit being attached to an opposite end of the corresponding hard disk; each fastening member comprising a latching slot, each connecting arm comprising a cutout, and each connecting arm being latched into the latching slot of the corresponding fastening member at the cutout, a plurality of dividers each interconnecting the first frame and the second frame, wherein each two adjacent dividers are configured for clamping a corresponding one of the hard disks therebetween, wherein each of the dividers comprises a clamping portion for clamping at least one corresponding hard disk, a connecting portion formed at an end of the clamping portion, and an inserting portion formed at the other end of the clamping portion.

7. The hard disk assembly of claim 6, wherein each fastening member further comprises a cap, a threaded portion fixed to the corresponding hard disk, and a flange, the latching slot is between the cap and the flange, the flange is between the latching slot and the threaded portion, and the flange defines a chamfer adjacent to the latching slot, with the chamfer tapered toward the cap.

8. The hard disk assembly of claim 7, wherein two first fixing units and two corresponding second fixing units are used to fix each hard disk, each hard disk comprises two first holes located at the end thereof adjacent to the first frame and two second holes located at the end thereof adjacent to the second frame, each first hole receives the threaded portion of the fastening member of a corresponding first fixing unit, and each second hole receives the threaded portion of the fastening member of a corresponding second fixing unit.

9. The hard disk assembly of claim 7, wherein the connecting arm is an elongated plate, and the cutout has a semicircular shape.

10. The hard disk assembly of claim 6, further comprising a plurality of fasteners, wherein the first frame has a plurality of connecting holes defined therein, the second frame has a plurality of inserting holes defined therein, the inserting portion of each divider is inserted in a corresponding inserting hole of the second frame, the connecting portion of each divider has a shaft hole defined along an axial direction thereof, the shaft hole of the divider is aligned with a corresponding connecting hole of the first frame, and one of the fasteners passes through the corresponding connecting hole of the first frame and is fixed into the shaft hole of the divider.

11. The hard disk assembly of claim 6, further comprising a connecting member, wherein two ends of the connecting member are respectively connected to the first frame and the second frame, and the first frame, the connecting member and the second frame thereby cooperatively form a U-shaped structure.

12. A hard disk assembly comprising: a hard disk; and an apparatus for fixing the hard disk, the apparatus comprising: a first frame; a second frame facing the first frame; and a fixing structure comprising a first fixing unit and a second fixing unit; each of the first fixing unit and the second fixing unit comprising a connecting arm and a fastening member corresponding to the connecting arm, the connecting arm comprising a fixed end and a free end opposite to the fixed end; the fixed end of the connecting arm of the first fixing unit being fixed to the first frame, the fixed end of the connecting arm of the second fixing unit being fixed to the second frame, the free end of the first fixing unit being suspended from the first frame between the first frame and the second frame, the free end of the second fixing unit being suspended from the second frame between the second frame and the first frame; the fastening member of the first fixing unit being attached to one end of the hard disk, the fastening member of the second fixing unit being attached to an opposite end of the hard disk, each fastening member comprising a latching slot, each connecting arm comprising a cutout, and each connecting arm being latched into the latching slot of the corresponding fastening member at the cutout, two dividers each interconnecting the first frame and the second frame, wherein the two dividers clamp the hard disk therebetween, wherein each of the dividers comprises a clamping portion for clamping the hard disk, a connecting portion formed at an end of the clamping portion and engaged to the first frame, and an inserting portion formed at the other end of the clamping portion and engaged to the second frame.

13. The hard disk assembly of claim 12, wherein each fastening member further comprises a cap, a threaded portion fixed to the hard disk, and a flange, the latching slot is between the cap and the flange, the flange is between the latching slot and the threaded portion, and the flange defines a chamfer adjacent to the latching slot, with the chamfer tapered toward the cap.

14. The hard disk assembly of claim 12, further comprising a plurality of fasteners, wherein the first frame has a plurality of connecting holes defined therein, the second frame has a plurality of inserting holes defined therein, the inserting portion of each divider is inserted in a corresponding inserting hole of the second frame, the connecting portion of each divider has a shaft hole defined along an axial direction thereof, the shaft hole of the divider is aligned with a corresponding connecting hole of the first frame, and one of the fasteners passes through the corresponding connecting hole of the first frame and is fixed into the shaft hole of the divider.

\* \* \* \* \*